United States Patent [19]

Davies

[11] 4,340,332
[45] Jul. 20, 1982

[54] BOAT CENTERING DEVICE

[76] Inventor: Ernest L. Davies, 2 Russell St., Newtown, Geelong, Victoria, 3220, Australia

[21] Appl. No.: 183,445

[22] Filed: Sep. 2, 1980

[30] Foreign Application Priority Data

Sep. 26, 1979 [AU] Australia .............................. PE0691

[51] Int. Cl.³ .............................................. B60P 3/10
[52] U.S. Cl. .................................. 414/467; 280/414.1
[58] Field of Search .............. 414/467, 507, 559, 533, 414/534, 537; 280/414 R; 211/100; 248/240.4, 293; 296/51, 61

[56] References Cited

U.S. PATENT DOCUMENTS

| 482,869 | 9/1892 | Huber et al. | 211/100 |
|---|---|---|---|
| 3,204,790 | 9/1965 | Collins | 414/534 |
| 3,800,968 | 4/1974 | Thompson . | |
| 3,812,988 | 5/1974 | Pyle . | |
| 3,837,509 | 9/1974 | Gladnick | 280/414 R X |
| 3,856,168 | 12/1974 | Mauck . | |
| 3,868,030 | 2/1975 | Bell . | |
| 3,883,159 | 5/1975 | Whitley | 280/414 R |
| 3,896,948 | 7/1975 | Finney . | |
| 3,974,924 | 8/1976 | Ullman . | |
| 3,984,121 | 10/1976 | Dobosi . | |
| 4,010,962 | 3/1977 | Groblebe . | |
| 4,029,227 | 6/1977 | Martinez . | |
| 4,033,600 | 7/1977 | Watson . | |
| 4,050,595 | 9/1977 | Bussard . | |
| 4,138,135 | 2/1979 | Hewitt . | |

Primary Examiner—Robert G. Sheridan
Attorney, Agent, or Firm—Depaoli & O'Brien

[57] ABSTRACT

A boat trailer centering accessory device for fitment to each rear corner of a boat trailer and which is a pair of boom gate frames which can be swung single-handedly and independently from a forward rest position for road transport alongside a trailer and clear of a boat and then rearwardly out over the water, with the trailer on a launching ramp out of the water, to form a centering causeway for a floating boat supported by the water. Each boom gate is formed as a generally quadrilateral shaped closed frame pivotally attached at one corner to a bracket which is mounted rearwardly on the side member of the trailer and is formed as an elongated U-shaped bracket with two short arms connected by a longer arm, one short bracket arm forms a pivot axle for a sleeve bearing mounted on the corner of the boom gate frame, while the longer arm also serves as a stop for limiting the drop height of the frame when it is swung to the forward transport position from the rearward centering position. The bracket also cradles the frame when being transported.

8 Claims, 5 Drawing Figures

BOAT CENTERING DEVICE

BACKGROUND OF THE INVENTION

1. Field of the Invention.

This invention relates generally to equipment and fittings on boat trailers to facilitate loading and launching of boats. More particularly, the invention relates to a simple accessory device for centering a boat in relation to a trailer while the boat is floating on and supported by the water and which can be extended rearwardly from the trailer by a single handed operation and alongside the boat for loading the boat in alignment with the longitudinal axis of the trailer.

2. Description of the Prior Art.

Many problems are associated with centering a boat with respect to a boat trailer by singlehanded operation particularly under rough and windy conditions. Most prior art arrangements for boat centering rely on structures which cradle or underly the boat or exert pressure on the boat and devices such as those of U.S. Pat. Nos. 3,800,968; 3,896,948; 4,010,962 place reliance on posts or rollers or cradling mechanisms or rocker arms which clamp against the sides of the boat (U.S. Pat. No. 4,033,600) under pressure of hydraulic rams, springs or the like or by reaction of the weight of the boat on levers which transmit this force to side clamping bars. Another type of prior art structure is a gantry (U.S. Pat. No. 4,029,227) wherein the boat is underslung and lowered into and out of the water on the gantry. Other types rely on heavy and complicated retractable auxillary sub-frame or beds or separately wheeled and retractable chassis under-carriages (U.S. Pat. No. 3,984,121). A tilting version of a separate retractable frame is also known (U.S. Pat. No. 3,812,988). Again many of these sliding frames are massive and require hydraulic power for their operation, particularly since they have to bear the additional weight of a loaded boat.

Other problems associated with boat docking and retrieval onto a trailer is that when the trailer is backed down the launching ramp in position under the boat the tail-light assemblies and wheels with bearings and brakes are submerged in water and often in salt water with resultant damage.

SUMMARY OF THE INVENTION

This invention relates generally to a boat-centering accessory device for a boat trailer which facilitates centering or alignment of the boat with the longitudinal axis of the trailer while the boat is still in the water and supported by the water and with the trailer out of the water on a launching ramp. Essentially, the device comprises a pair of boom gate frame members which are horizontally pivoted near the end and on either side of a boat trailer so that the members may be carried in a forward or road transport position alongside the trailer and clear of a boat and can then be swung backwards out over the water and alongside a floating boat supported by the water to form a centering causeway for the boat to enable it to be guided into alignment with the longitudinal axis of the trailer.

More particularly, each boom gate member is formed as a closed frame of quadrilateral configuration and is mounted on the side frame member of a boat trailer by a U-shaped bracket with two short arms connected by an elongate connecting arm, the base of each short arm is fixed to the trailer side frame member and one of the short arms is also itself a pivot axle which is designed to be passed through a sleeve which forms a tubular bearing at one corner of the boom gate frame and for this purpose is fixed to, or is incorporated into the frame along the direction of the pivot axis transverse to the general direction of the mounted frame. The U-bracket also provides stop means for limiting the drop height of the boom gate frame when in the forward road-transport position alongside the trailer and clear of a boat loaded on the trailer. The stop means which also serves to cradle the boom gate frame during transport is preferably formed by the elongate connecting arm of the bracket and for this purpose the frame is also at an angle to the side of the trailer at the forward part of the frame. The short bracket arms in one modification are extended in length and the pivot axle on one arm is extended with the bearing on one corner of the boom gate frame remaining at the same fixed length as before to allow the frame to slide in a direction transverse to the boat trailer axis to allow the width between the frames to be varied for boats of different width.

DESCRIPTION OF THE PREFERRED EMBODIMENTS

Figure 1:
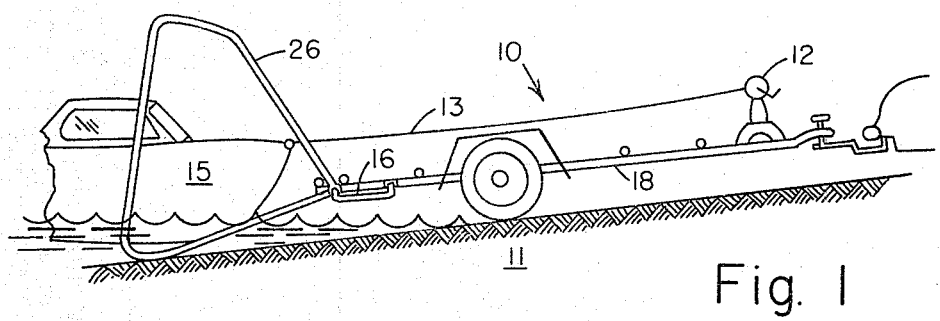
FIG. 1 is a side elevation of the boat centering device constructed in accordance with the principles of the present invention installed on a boat trailer in extended boat docking and centering position.
Figure 2:
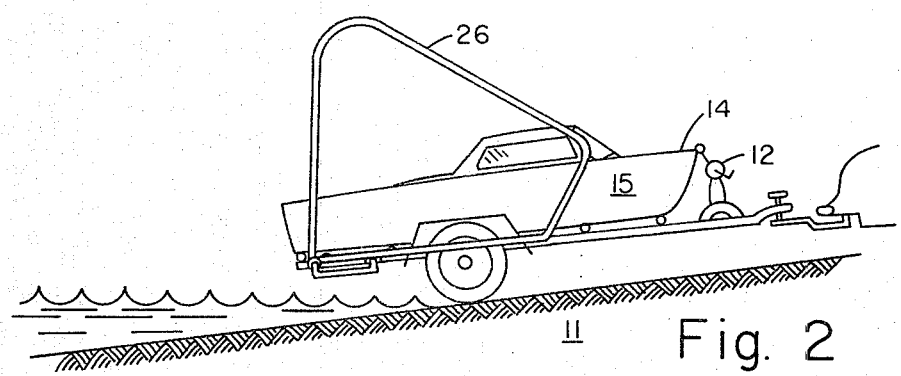
FIG. 2 is a similar view to FIG. 1 but with the apparatus in retracted or transport position onto a trailer.
Figure 3:
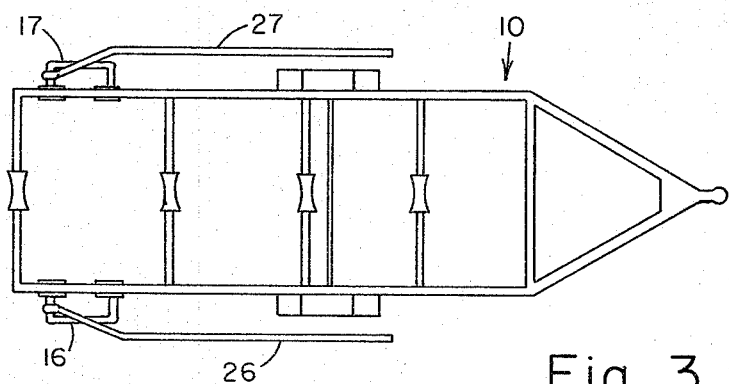
FIG. 3 is a plan view of the apparatus of FIG. 1.
Figure 4:
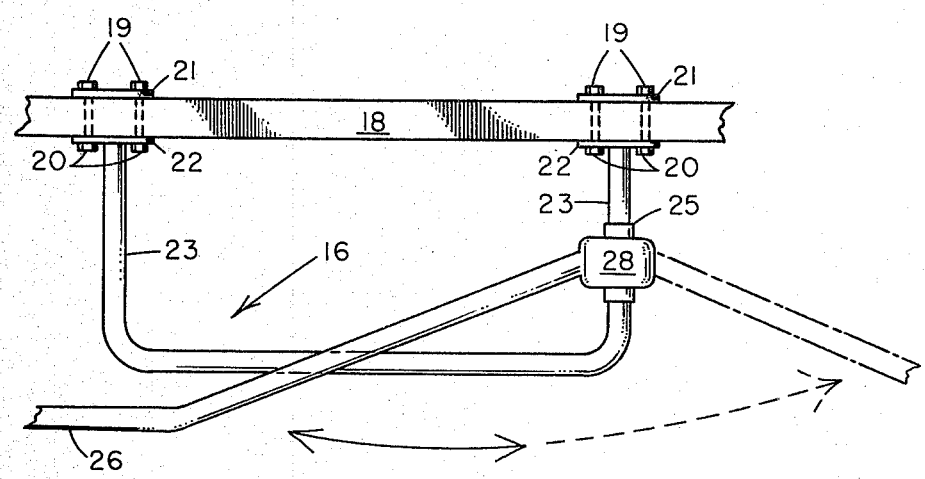
FIG. 4 is an enlarged perspective view of one of the pair of mounting bracket and pivot assemblies for one boat width only.

Referring now to the drawings, there is shown in FIGS. 1 to 3 a boat trailer 10 on a boat launching ramp 11 held by a line to the hand winch 12 on the front end. The boat bow line 13 is attached to the bow 14 of the boat 15 which is in docking position on the water, ready to be loaded onto the trailer. At the rear end of the trailer and on either side thereof, there is mounted a pair of brackets 16 and 17 [See FIGS. 4 and 5] constructed in accordance with the principles of this invention which in these illustrations are preferably fixed to the trailer chassis side member 18 by bolt and nut assemblies 19,20 passed through apertured plates 21, 22 and through corresponding holes drilled in the chassis side member. In FIG. 4 the bracket is generally U-shaped in configuation with two arm sections 23 and 24 one of which comprises a stub axle 25 forming a pivot and anchorage for one corner of the boom gate, boat centering causeway forming member which is generally in the form of the quadrilateral-shaped closed frame 26 which is adapted to swing in an arcuate path in one plane between two extreme positions of travel, namely between a retracted, forward or road transport position alongside the trailer as shown in FIG. 2 and an extended rearward position out from the trailer as shown in FIG. 1 over the water and alongside a boat. Each swing frame forms one of a pair of independently moveable causeway forming boom gate frame members 26, 27 which when in use co-operate in the extended position to form a causeway into which a floating boat may be manually maneuvered by a single operator using the bow line of the boat.

Figure 5:
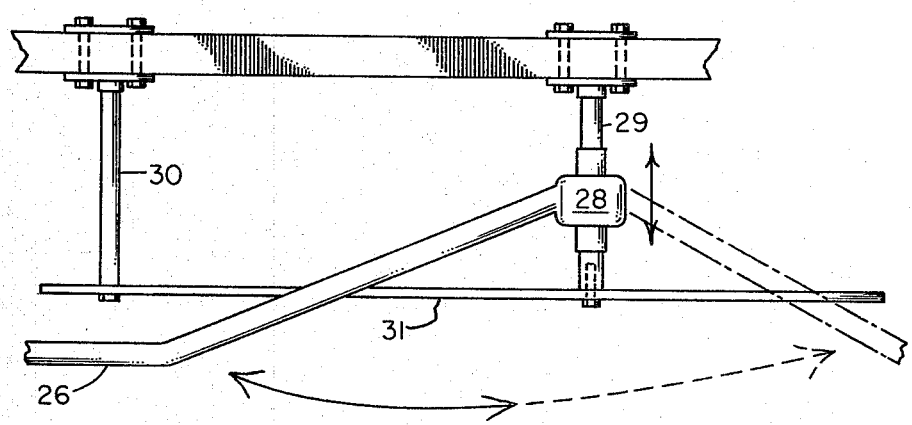
FIG. 5 is an enlarged view of a modification of the assembly of FIG. 4 adapted for boats of different width.

The modification shown in FIG. 5 is suitable for use with boats of different width wherein the bearing portion 28 of the causeway frame member 26 is slidably as well as pivotally mounted on the lengthened stub axle 20 so as to enable the width of the causeway forming frame members to be varied. The U-shaped brackets of the previous embodiment are replaced by the two pipe or shaft members 29 and 30 and a flat steel plate 31 is bolted to the pipes to form a drop height limit stop.

Other variations of mounting means and geometric shape of the causeway forming means are possible and it is conceivable and within practical feasibility to extend the brackets on either side of the pivot axle to form limiters for both fore and aft drop heights.

The causeway forming frame members may be fabricated from any suitable material from metallic to synthetic plastics or resins. An economical material is galvanized iron pipe such as black pipe phosphor dipped followed by powder coating electrostatically sprayed on and then baked. Aluminium or fibreglass reinforced polyester resin tubing could also be used. Stainless steel or chrome-plated tubing may also be preferred.

I claim:

1. A boat trailer accessory device for singlehandedly centering a boat in line with a boat trailer which is on a launching ramp out of the water while said boat is floating on and supported by the water, which comprises a pair of boom gate members pivotally mounted on each side and adjacent the end of said boat trailer, said boom gate members being carried forwardly alongside said trailer when in a road transport position and then being swung by hand rearwardly of said trailer and out over the water beside said floating boat to form a portable causeway alongside said boat for retrieval of said boat, wherein each said boom gate member is formed as a closed boom gate frame of quadrilateral configuration and is pivotally mounted on a side frame member of said boat trailer by a U-shaped bracket comprising two short bracket arms connected by an elongated connecting arm, the base of each said short bracket arm being fixed to said trailer side member, one of said short bracket arms being a pivot axle which is passed through a tubular bearing at one corner of said boom gate frame and transverse to the plane of said frame.

2. Device as claimed in claim 1, wherein each said U-shaped bracket includes stop means for limiting the drop height of the said gate frame when said frame is swung back into a forward, road-transport position alongside said trailer and about said pivot axle of said U-shaped bracket.

3. Device as claimed in claim 2, wherein said drop height stop means comprises said elongated connecting arm of said U-shaped bracket.

4. Device as claimed in claim 1, wherein said short bracket arms are extended in length and said pivot axle on one said arm is extended with said tubular bearing remaining the same length to allow said frame to slide in a direction transverse to the longitudinal axis of said trailer to allow the width between said boom gate frames to be varied for boats of different width.

5. A boat trailer accessory device for single-handedly centering a boat in line with a boat trailer on a launching ramp, with the boat floating on and supported by water, which comprises a pair of boom gate members, each member being formed as a closed frame of quadrilateral configuration which is pivotally attached at one corner thereof to the side and adjacent the end of said boat trailer by a bracket bearing member comprising a pivot sleeve at one corner of said boom gate closed frame and transverse to said frame, said bracket bearing member being attached to a pivot axle on a U-shaped bracket which comprises two short arms connected by an elongated arm, each of the short arms having a base fixed to a side member of said boat trailer, one of said short bracket arms being a pivot axle for said pivot sleeve, the elongate connecting arm providing means for limiting the swing drop height of said boom gate frame when the frame is swung back into the forward, road transport position about said short arm pivot axle, each said boom gate closed frame being carried forwardly alongside said trailer when in the road transport position and then swung upwardly and rearwardly of said trailer in a vertical arc and out over and into the water beside said floating boat to form a portable causeway alongside said boat for retrieval of the boat by pulling the bowline of the boat from the front and centre of the trailer.

6. A device as claimed in claim 5 wherein each said boom gate frame is mounted on a separate pivot axle and is independently operable.

7. A bracket for pivotally supporting a vertically swingable frame of a boat centering boom gate on the side of a boat trailer having side members during movement of said frame between a retracted forward road transport position alongside said trailer and a rearwardly extended docking position out over water and alongside a floating boat, said bracket being of U-shaped configuration and comprising two short arms connected by an elongate arm, the base of each short arm being adapted to be fixed to one said side member of said boat trailer, one short arm being an axle which provides pivotal support for a bearing member fixed transversely to said swingable frame at one corner thereof.

8. A bracket as claimed in claim 7 wherein said elongate arm of the bracket acts as a stop for limiting the vertical drop height of said boom gate frame when said frame is swung forward to said road transport position on said boat trailer, the stop also acting as a carrying cradle for supporting said boom gate frame during road transport position alongside said trailer.

* * * * *